Dec. 19, 1933.  D. S. GARDNER ET AL  1,939,687
KNIFE
Filed Dec. 7, 1931
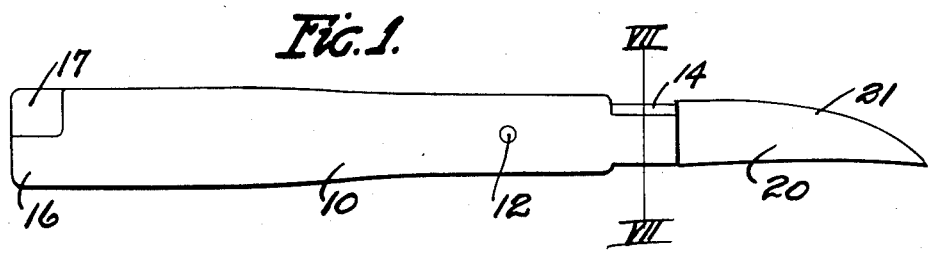
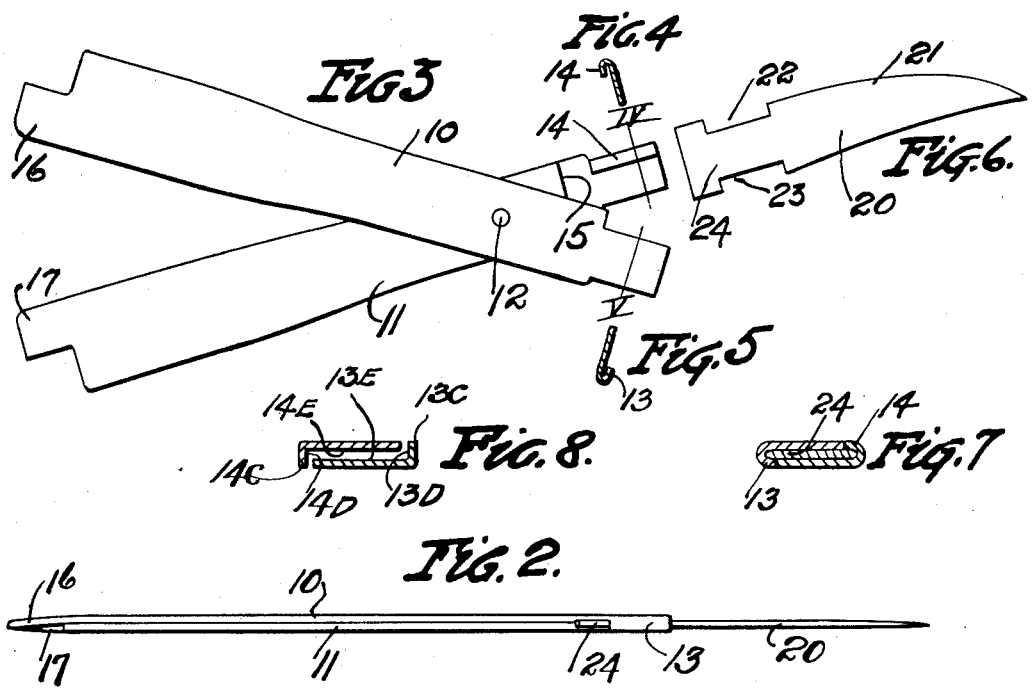

Patented Dec. 19, 1933

1,939,687

UNITED STATES PATENT OFFICE 1,939,687

KNIFE

David S. Gardner and Joseph A. Gardner, Memphis, Tenn., assignors of one-sixth to Royal Van Brocklin and one-sixth to Steven A. Van Brocklin, both of Memphis, Tenn.

Application December 7, 1931. Serial No. 579,496

12 Claims. (Cl. 30—9)

This invention relates to improvements in knives which comprise a holder and interchangeable blades therefor, and particularly to such knives for surgical use.

In surgical operations it is of extreme importance that very sharp knives be used, that these knives should be shaped, so far as their cutting edges are concerned, for the particular operation for which they are to be used, and that they should be thoroughly sterilized before using.

These conditions are most effectively met by the use of individual blades in connection with the holder. Where such holder and blades are employed it is of extreme importance that the blades shall be rigidly held in the holder, that after use they should be readily removable, and that such removal should be accomplished with minimum danger to the operator charged with the duty of removing a blade often dangerously infected.

The objects of the present invention are:

First, to make a handle and an insertable blade therefor which may be rigidly locked together into a rigid unit;

Second, to make a handle and a blade therefor in which the handle parts may be manipulated to release the blade and allow it to drop therefrom;

Third, to make a handle adapted to accomplish such purposes; and

Fourth, to make a blade for use with such a handle.

The means by which the foregoing and other objects are accomplished and the manner of their accomplishment will readily be understood from the following specification on reference to the accompanying drawing, in which:

Fig. 1 is a side view of the improved handle with the blade inserted and secured therein;

Fig. 2 is a corresponding edge view;

Fig. 3 is a side view showing the handle parts swung into blade releasing or receiving position;

Figs. 4 and 5 are respectively, sections on the lines IV and V of Fig. 3;

Fig. 6 is a side view of the detached blade;

Fig. 7 is a section on the line VII—VII of Fig. 1;

Fig. 8 is a section on the line VIII—VIII of Fig. 11, both Figures 7 and 8 being on an enlarged scale;

Fig. 9 is a side view of a modified form of handle and blade showing fragmentary portions of each;

Fig. 10 is a side view of a blade having a further modified form of shank; and

Figs. 11 and 12 are side views respectively of the jaw end of a pair of handles and a blade having a complementary shank.

Referring now to the drawing in which the various parts are indicated by numerals, the handle comprises two substantially identical elongated flat parts 10 and 11 pivotally secured together as by a rivet 12. The handle parts extend forwardly beyond the rivet and are provided respectively with grooved blade engaging jaws 13, 14 which are formed by turning inwardly one edge of each handle part, thus forming blade engaging jaws which are substantially J shaped in cross section, and which are positioned so that the grooves are oppositely disposed and adapted to engage opposite edges of a blade with the stems of the J's above and below the blade.

The handle part 11 is provided with a shoulder 15, the depth of which may be the full thickness of the blade or half the thickness of the blade. In the former case the handle member 10 is not shouldered but in the latter case it is provided with a shoulder similar to that on the handle 11. At the opposite end of the handle parts each is preferably halved to form complementary locking lugs 16, 17 the outer ends of which lugs are bent inwardly so that when forced past each other, these ends snap into place to hold the handles closed.

20 is the blade which is usually of thin steel and ordinarily is sharpened on one edge 21 only. The shank of the blade may be provided with one rectangular notch 22, but preferably is notched on both sides 22, 23. The length of these notches is the same as the length of the jaws 13, 14, the distance from the back end of these jaws to the shoulder 15 is complementary to the T-shaped end 24 of the blade and the grooves are made to fit the thickness of the blade to be used therewith.

In using the device the handle parts are swung apart substantially as shown in Fig. 3, the blade shank is engaged by one of the jaws and the other jaw closed on the blade. In accomplishing this the longer ends of the handle parts are pushed around until the lugs 16, 17 engage and lock, clamping the knife securely between the jaws 13, 14 and making it rigid with the handle. To release the blade it is only necessary to slightly twist the lugs 16, 17 to disengage them and thereafter to swing the handle parts open allowing the blade to drop out of the jaws.

It will be seen that it is not necessary in ejecting the blade to touch the same with the hands so that after use the blade may be disposed of or dropped into a sterilizing vessel without being touched by hand.

In the modified form shown in Fig. 9, the jaws 13A, 14A are curved arcuately inward and the shank of the blade 20 is curved inward in complementary manner. The jaws 13A, 14A may be curved over in cross section as are the jaws 13, 14 in Fig. 7, or they may extend upward at right angles to the body of the jaw as shown in Fig. 8.

In Fig. 10, a blade 20B is shown which has a shank convexed on opposite edges instead of concaved as in Fig. 9. For such a blade the jaws would be of complementary shape. In Fig. 11 the jaws 13C, 14C converge toward their ends. These jaws as shown in Fig. 8, may be turned upward and downward at right angles or they may be curved as shown in Fig. 7. The blade 20C for use with this type of handle has a shank with diverging edges such divergence conforming to the convergence of the handle jaws.

It will be noted by reference particularly to Fig. 8, that the inner sides 13D, 14D of the jaws is adapted to engage the edges of the blade shank whereas the upper and undersides 13E, 14E respectively are adapted to engage the sides of the blade shank when it is disposed therewithin, this also being true of the grooved forms.

It will be understood that the various forms of jaw and of blade shank here shown are illustrative only of a blade having a deformed shank and a handle having jaws which are complementary to the shank shape for use therewith.

Having described the invention what is claimed is:

1. In a knife, a handle comprising a pair of pivotally connected parts, each having a grooved blade engaging jaw, substantially J shaped in cross section, said jaws being disposed with the grooves facing and the shanks overlapping and a blade of thin metal having a handle engaging shank, notched on opposite sides thereof, said notches being complementary to said jaws, whereby the notched portions of said shank may be engaged and held in place by said jaws.

2. In a knife, a handle comprising a pair of pivotally connected members, each having a grooved blade engaging jaw, disposed with said grooves facing and a blade of thin metal having a handle engaging shank notched on opposite sides thereof, said notches being complementary to said jaws whereby the notched portions of said shank may be engaged and held by said jaws.

3. A knife handle, comprising a pair of elongated flat handle members, superposed one on the other, a pin pivotally securing said members together, near one of the ends thereof, said members each having a jaw and extending beyond said pin, said jaw ends each having a side edge bent toward the other thereof and turned inward to form oppositely disposed grooved jaws, adapted to engage the edges of a thin metal knife blade.

4. In a surgical knife, a pair of pivotally connected handle members having interlocking lugs on their outer ends and having their inner ends extending beyond said pivot to form blade engaging jaws, said jaws being each substantially J shaped in cross section and being disposed with the grooves of said J's facing and the stems thereof overlapping, and a blade of thin metal having opposite edges of its shank notched for engagement with said J shaped jaws.

5. In a surgical knife, a pair of elongated, flat, pivotally connected handle members having their outer ends halved to form interlocking lugs and having their inner ends extending beyond said pivot, each of said inner ends having one edge inwardly turned to form a grooved jaw, said jaws being each substantially J shaped in cross section and the grooves therein being opposed and a blade of thin metal having opposite edges of its shank notched for engagement with said jaws.

6. In a surgical knife, a pair of pivotally connected handle members having interlocking lugs on their outer ends and having their inner ends extending beyond said pivot, said jaws being each substantially J shaped in cross section with the grooves of said J facing and a blade of thin metal having opposite edges of its shank notched for engagement with said shaped jaws.

7. A knife handle, comprising a pair of elongated handle members pivotally secured together, each member having a grooved blade engaging jaw extending beyond said pivotal connection, disposed with the grooves of said jaws facing and adapted to engage the edges of a knife blade.

8. A knife handle, comprising a pair of elongated handle members pivotally secured together, each member having a grooved blade engaging jaw extending beyond said pivotal connection, disposed with the grooves of said jaws facing and adapted to engage the edges of a knife blade and each member having locking means on the end remote from the jaw.

9. A handle for a knife blade, comprising a pair of elongated members pivotally secured together, each of said members having a jaw on one end and a locking part on the opposite end, said pivotal connection lying intermediate said ends, said locking parts being complementary, each of said jaws having portions adapted to engage respectively against a side and an edge of a blade shank, and said jaws being disposed with corresponding engaging portions facing.

10. In a knife, a pair of handle members and a complementary detachable blade, said handle members being pivotally secured together, and each having an integral jaw-portion extending beyond said pivotal connection, said jaw portions being superposed and the facing surface of at least one jaw being cut away to receive said blade therebetween and form a shoulder for the shank end thereof, said jaws having each an inwardly turned edge, the proximate faces of said edges engaging the edges of said blade.

11. In a knife, a pair of handle members and a complementary detachable blade, said handle members being pivotally secured together, and each having an integral jaw portion extending beyond said pivotal connection, said jaw portions being superposed and cut away on their facing surfaces to receive said blade and form a shoulder for the end of the shank thereof, said jaws having each an inwardly bent edge portion, said edge portions facing each other and converging toward their ends.

12. A handle for a knife blade, comprising a pair of elongated handle members pivotally secured together and having complementary jaws, said jaws having portions extending beyond the pivotal connection, and adapted to engage respectively against a side and an edge of a blade shank, said jaws being disposed with corresponding engaging portions facing each other.

DAVID S. GARDNER.
JOSEPH A. GARDNER.